United States Patent [19]

Cartry

[11] Patent Number: 5,404,381
[45] Date of Patent: Apr. 4, 1995

[54] DEVICE FOR CHECKING THE GUIDE ELEMENTS OF A GUIDE TUBE FOR THE UPPER INTERNALS OF A PRESSURIZED WATER NUCLEAR REACTOR

[75] Inventor: Jean-Pierre Cartry, Lyons, France

[73] Assignee: Framatome, Courbevoie, France

[21] Appl. No.: 103,635

[22] Filed: Aug. 11, 1993

[30] Foreign Application Priority Data

Aug. 11, 1992 [FR] France .................. 92 09915

[51] Int. Cl.6 ........................................... G21C 17/00
[52] U.S. Cl. ..................................... 376/248; 376/249
[58] Field of Search ............... 376/248, 245, 249, 258, 376/450; 73/1 D, 862.633, 293, 304 C

[56] References Cited

U.S. PATENT DOCUMENTS

| | | | |
|---|---|---|---|
| 3,982,425 | 9/1976 | McLain | 73/67.85 |
| 4,201,468 | 5/1980 | Margolis et al. | 356/28.5 |
| 4,583,297 | 4/1986 | Jewell | 33/533 |
| 4,741,878 | 5/1988 | Gebelin et al. | 376/248 |
| 4,958,908 | 9/1990 | Rockwell et al. | 350/311 |
| 5,006,301 | 4/1991 | Lexa | 376/259 |
| 5,078,955 | 1/1992 | Hydeman et al. | 376/248 |
| 5,198,657 | 3/1993 | Trost et al. | 250/214 VT |
| 5,265,130 | 11/1993 | Yoshida et al. | 376/245 |

Primary Examiner—Donald P. Walsh
Assistant Examiner—Meena Chelliah
Attorney, Agent, or Firm—Pollock, Vande Sande & Priddy

[57] ABSTRACT

The checking device comprises a mast (10) extending vertically in its service position and centered in the central free space of the guide tube, a flat blade-shaped element (36) pivoting on the lower part of the mast (10), a sensor (42) rotating about a pin on an outer end (36a) of the blade-shaped element, and a device (39) for rotating and powering the sensor (42) and for gathering the measurement signals emitted by it (42).

11 Claims, 6 Drawing Sheets

DEVICE FOR CHECKING THE GUIDE ELEMENTS OF A GUIDE TUBE FOR THE UPPER INTERNALS OF A PRESSURIZED WATER NUCLEAR REACTOR

FIELD OF THE INVENTION

The invention relates to a device for checking the guide elements of a guide tube for the upper internals of a pressurized water nuclear reactor.

BACKGROUND OF THE INVENTION

Pressurized water nuclear reactors comprise, inside a vessel, the core of the nuclear reactor consisting of assemblies of prismatic shape arranged with their axis vertical and, above the core, upper internals comprising in particular a set of vertical guide tubes making it possible to guide control rods consisting of bundles of rods extending parallel to one another and enclosing a material which absorbs neutrons.

The guide tubes of the upper internals comprise discontinuous guide elements consisting of plane plates, called guide plates pierced with openings and continuous guide means consisting of sheaths and slit tubes extending in the vertical direction of the tube, the openings of the plates and the bores of the continuous guide means being in positions corresponding to the positions of the absorber rods in the bundle of the control rod.

The openings passing through the guide plates and the bores of the sheaths and of the slit tubes constituting the guide elements for the absorber rods have lateral slots putting them in communication with a free space left in the central part of the guide tube and allowing passage of a spider body for assembling the cluster of parallel absorber rods.

In order to control the nuclear reactor by adjusting the reactivity of the core, the clusters of absorber rods are displaced in the vertical direction, during operation of the reactor, so that the absorber rods are introduced over a greater or lesser height inside certain assemblies of the core. During their displacement in the vertical direction, the absorber rods of the control rods are each guided by a series of aligned openings in the guide plates and by the internal bore of a guide sheath or of a split tube.

After a certain period of operation of the nuclear reactor, the openings in the guide plates and the bores in the sheaths and in the split tubes may exhibit wear, manifested for example by ovalization of the cross-section of the opening or of the bore, so that the absorber rods are no longer guided completely satisfactorily.

It is therefore necessary to carry out periodic checks and measurements on the guide elements for the upper internals of the nuclear reactor, so as to determine whether some of these guide elements need to be replaced or repaired.

Checking the guide elements must be carried out during a period of shutdown for checking, repair and/or reloading the nuclear reactor, during which period the upper internals are withdrawn from the vessel and laid down in the bottom of the pool of the reactor, on a storage and intervention stand.

It is necessary to carry out extremely precise measurements on the guide elements for the upper internals, insofar as wear of these guide elements requiring repair or replacement is manifested by small differences between the dimensions of the openings or bores of the guide elements in various transverse directions.

In French Patent Application FR-A-89-04082 filed by Framatome, it was proposed to carry out these checks on the basis of comparative capacitance measurements of capacitors constituted by armatures distributed about the axis of a sensor which is displaced in a substantially coaxial manner inside the guide elements.

This device, which makes it possible to perform rapid measurements over the entire length of the guide elements may, however, lack precision and requires complex elements for gathering and using the measurements.

SUMMARY OF THE INVENTION

It is therefore an object of the invention to provide a device for checking the guide elements of a guide tube for the upper internals of a pressurized water nuclear reactor, arranged underwater in a pool, the guide elements comprising, inside guide tubes having their axes vertical, guide openings passing through horizontal plates called guide plates, and bores of tubular sheaths having a vertical axis, opening laterally into a free space at the central part of the guide tube, this device making it possible to carry out a precise check on each of the guide elements successively, starting from the upper level of the pool.

With this objective, the checking device according to the invention comprises:
- a mast extending in the vertical direction in its service position in the pool,
- means for centering the mast in the central free space of the guide tube at its lower part,
- a flat blade-shaped element mounted so as to pivot about at least one horizontal pin on the lower part of the mast, between a retracted position and at least one extracted service position, in which an external end of the blade-shaped element projects laterally relative to the mast,
- a sensor comprising at least one element mounted so as to rotate about a pin, at the outer end of the blade-shaped element so that the rotation pin of the rotary element of the sensor is vertical in the service position of the blade-shaped element,
- remote control means for displacing, by pivoting, the blade-shaped element, and
- means for rotating and powering the sensor and for gathering the measurement signals emitted by the sensor.

BRIEF DESCRIPTION OF THE DRAWINGS

In order to make the invention more easily understood, there will now be described, by way of example and with reference to the appended drawings, an embodiment of a checking device according to the invention and the implementation of this checking device.

DETAILED DESCRIPTION

Figure 1:
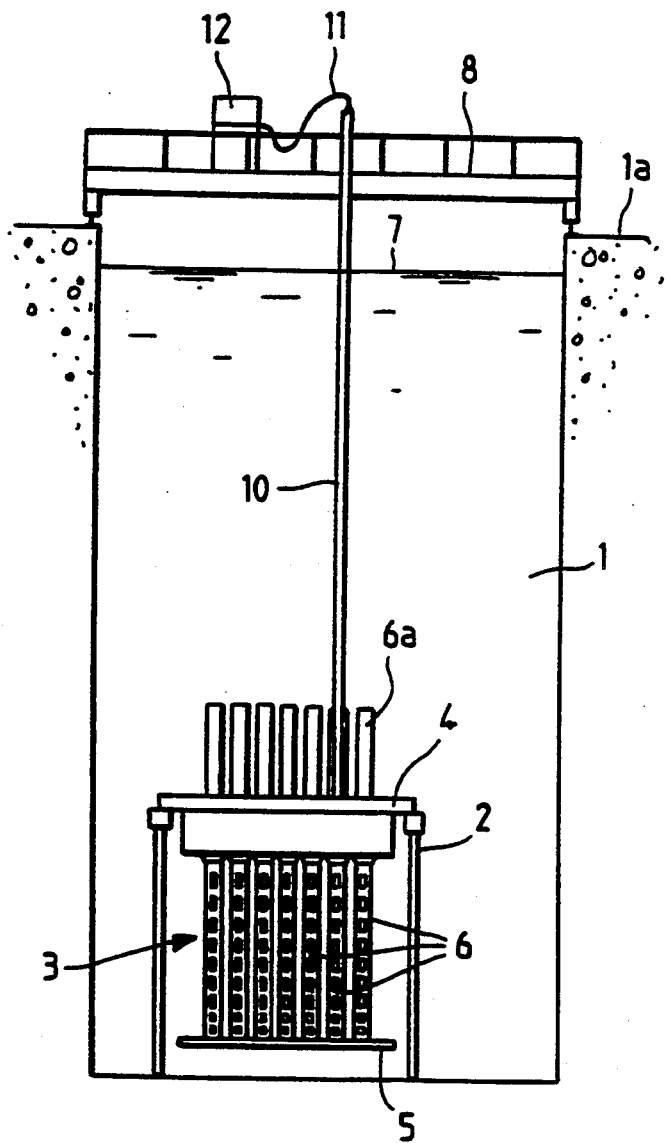
FIG. 1 is a schematic elevation view of the upper internals of a nuclear reactor in position on a storage stand in the pool of a reactor, during a checking operation using the device according to the invention.

FIG. 1 shows part of the pool 1 of a nuclear reactor on the bottom of which rests a stand 2 allowing storage of the upper internals 3 of the nuclear reactor.

The upper internals 3 comprise an upper plate 4 and a lower plate 5 constituting the upper plate of the core of the nuclear reactor coming to bear on the upper end of the fuel assemblies, when the upper internals 3 are in the service position in the reactor vessel. The internals 3 additionally comprise a set of guide tubes 6 connected to the upper plate 4 and to the lower plate 5 of the internals and each comprising a first part interposed between the upper plate 4 and the lower plate 5 and a second part 6a fixed above the upper plate 4.

Support columns making it possible to hold the plates 4 and 5 and to ensure the rigidity of the internals 3 are arranged between the plates 4 and 5 parallel to the tubes 6.

During a shutdown of the reactor for repair and reloading, the internals 3 are removed from the vessel of the reactor and laid down on the storage stand 2, the internals 3 resting by means of the upper plate 4 on vertical support columns of the stand 2.

The pool 1 is filled with water up to a level 7 and intervention is performed from a bridge-walkway 8 arranged above the upper level 1a of the pool 1.

The intervention device according to the invention comprises, in particular, a mast 10 of long length which can be manipulated from the bridge-walkway 8 so as to position it inside a guide tube 6, as will be explained herein below.

A cable 11 comprising conductors which are connected at their lower part to the sensor of the checking device has one end at the level of the bridge-walkway 8 which is connected to a unit 12 which processes and records the measurement parameters.

The cable 11 makes it possible to power the sensor with electric current and optionally to rotate it, as will be explained herein below.

Figure 2:
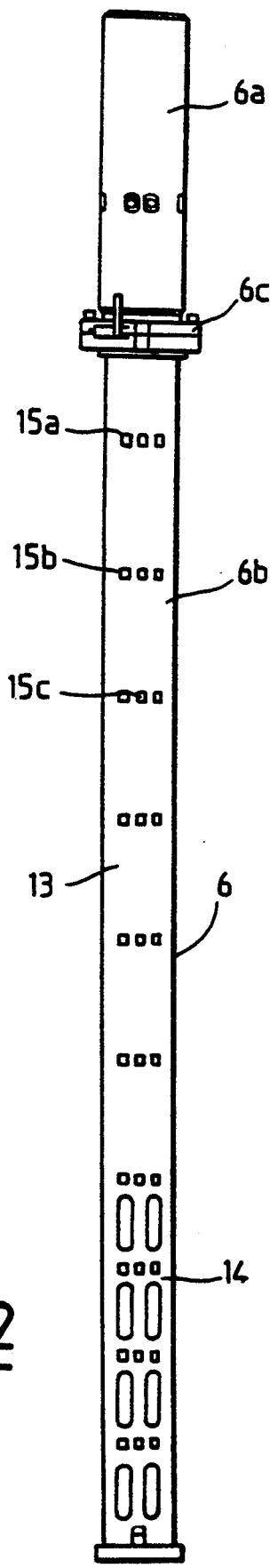
FIG. 2 is an elevation view of a guide tube for the upper internals shown in FIG. 1.

FIG. 2 shows a guide tube 6 for the internals 3 shown in FIG. 1.

The guide tube 6 comprises an upper part 6a and a lower part 6b which are connected to each other by assembly means 6c comprising supposed flanges fixed by screws.

The upper part 6a of the guide tube 6 is intended to be placed above the upper plate 4 of the upper internals and the lower part 6b is intended to be placed between the upper plate 4 and the lower plate 5.

The two parts 6a and 6b of the guide tube comprise a substantially cylindrical external casing which is pierced by openings and which encloses guide elements.

The lower part 6b, which constitutes the main guiding part of the tube 6 itself, comprises an upper part 13 constituting the discontinuous guide part of the guide tube and a lower part 14 constituting the continuous guide part of the control rods.

Figure 3:
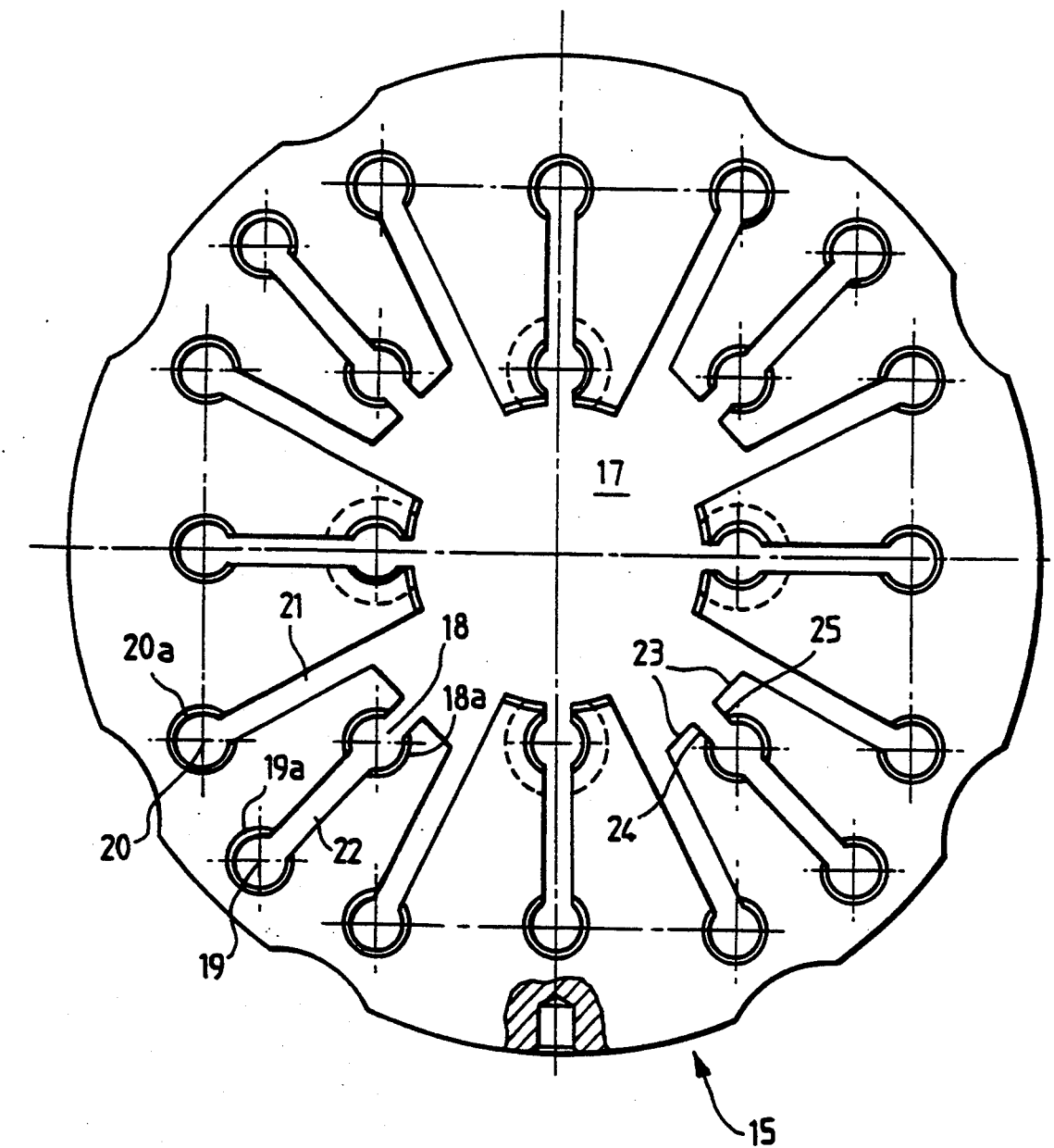
FIG. 3 is a plan view of a guide plate of the tube guide shown in FIG. 2.

In the discontinuous guide part 13, the outer casing of the tube 6 encloses guide plates 15 such as shown in FIG. 3, at successive locations 15a, 15b, 15c, ... regularly spaced along the length of the part 13 of the lower section 6b of the tube 6.

Figure 4:
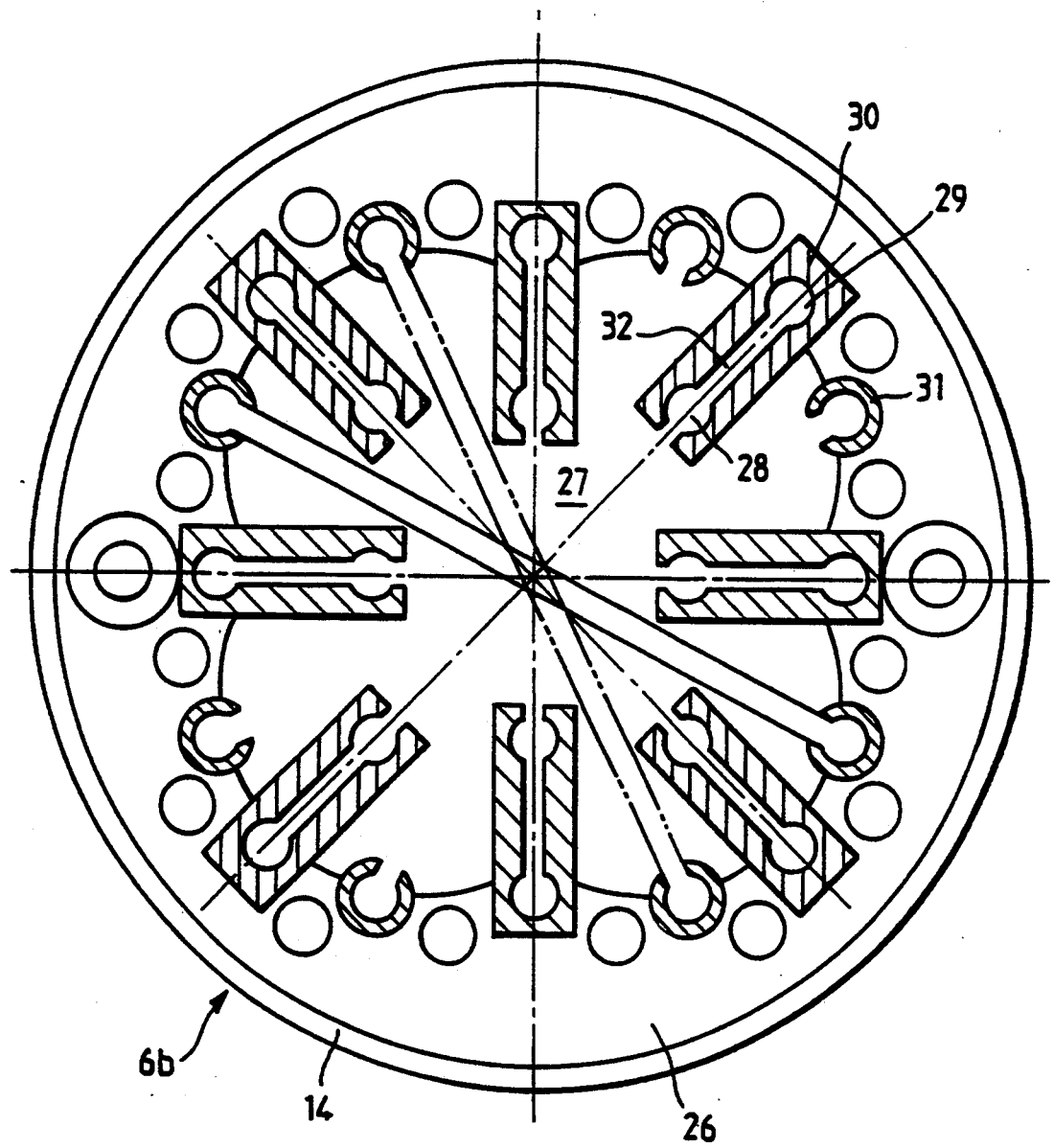
FIG. 4 is a view in transverse section of the continuous guide elements of the guide tube shown in FIG. 2.

Along the entire length of the continuous guide part 14 of the lower section 6b of the tube guide, there are arranged continuous guide elements, such as those shown in FIG. 4.

The discontinuous guide plates or guide plates 15 represented in FIG. 3 are composed of metal plates which are cut out so as to leave a free space 17 in the central part of the plate 15 and guide openings such as 18, 19 and 20 for the absorber rods of the control rod which may be introduced and guided in the guide tube enclosing guide plates 15.

The openings such as 20 are arranged at the end of a slot 21 passing through the guide plate 15 and opening into the central free space 17.

The openings such as 18 and 19 are aligned along a slot 22 also opening into the central free space 17.

Thus all the guide openings 18, 19 and 20 of the guide plate 15 open into the central free space 17.

The part of the openings 18 communicating with the central free space 17 has circumferential surfaces 23 and radial surfaces 24 and 25.

Some of these surfaces may be coated with an anti-wear layer or component.

The surfaces, such as 23, 24 and 25 which do not undergo significant wear by friction during the use of the control rods are used as reference surfaces during the use of the checking device according to the invention.

FIG. 4 shows, in cross-section, the continuous guide part 14 of the guide tube 6 which comprises, inside the cylindrical casing of the section 6b of the guide tube, a support 26 comprising an axial central opening defining a free space 27 in the extension of the free space 17, inside the guide tube.

The continuous guide elements are fixed to a support 26 and are composed of guide sheaths 30 and split tubes 31 arranged in the axial direction of the guide tube 6.

Each of the guide sheaths 30 delimits two guide bores 28 and 29 connected together by a slot 32 and opening into a free space 27.

The tubes 31 comprise a slot inside the free space 27.

In this way, the guide bores 28 and 29 of the sheaths 30 and the split tubes 31 all communicate with the central free space 27 of the guide tube.

The end parts of the guide tubes situated in the free space 27 and the surfaces of the tubes 31 delimiting the slots of these tubes constitute reference surfaces which do not undergo significant wear during displacement of the control rods.

The openings 28, 29 and 30 in the guide plates are arranged so as to reproduce, in transverse section, the network of guide tubes of an assembly of the core of the nuclear reactor in which tubes the absorber rods of a control rod are introduced.

Furthermore, the guide plates 15 are arranged parallel to one another in positions such that the openings in the various successive plates are aligned.

The continuous guide bores 28 and 29 of the sheaths 30 and the bores of the tubes 31 are, also arranged so as to reproduce the network of guide tubes of an assembly of the nuclear reactor.

The bores of the continuous guide elements are aligned with the series of openings in the guide plates.

Figure 5:
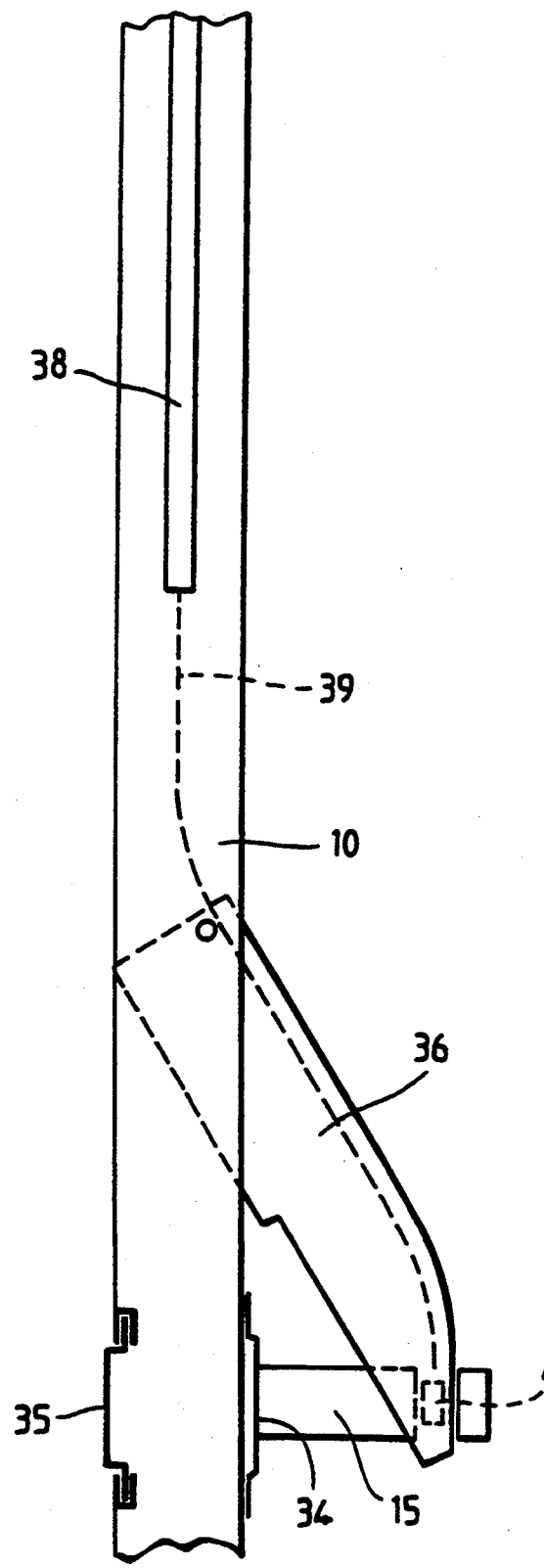
FIG. 5 is a schematic elevation view of the lower part of the mast of the checking device according to the invention and according to a first embodiment.

FIG. 5 shows the lower part of the mast 10 of the checking device which comprises a tubular casing whose transverse section has a shape and dimensions making it possible to introduce it into the free space 17 of the central part of the guide plates and into the free space 27 between the inner parts of the guide sheaths 30 in the continuous guide part 14 of the guide tube.

The mast comprises, in the vicinity of its lower end, a stop 34 projecting radially outwards and a spring 35 mounted in and projecting from the casing of the mast 10. The stop 34 and the spring 35 are placed on opposite sides of the axis of the mast.

When the mast 10 is introduced in the central space of the guide plates and of the continuous guide part of the guide tube, the elements 34 and 35 make it possible, by pressing these elements on to parts of the inner surface of the guide plates and of the sheaths, to center and immobilize the mast at a certain height inside the guide tube.

The casing of the mast 10 comprises a longitudinal slot in the vicinity of its lower part, in the region of which there is mounted a pivoting or curved blade 36 capable of being displaced relative to the mast, by pivoting, between a retracted position inside the casing of the mast and an extracted position, as will be explained hereinbelow.

Inside the casing of the mast 10 there is fixed a metal tube 38, in an arrangement parallel to the axis of the casing 10.

The tube 38 is connected to a flexible plastic sleeve 39 ensuring, the rotation of the sensor of the checking device.

Figure 6:
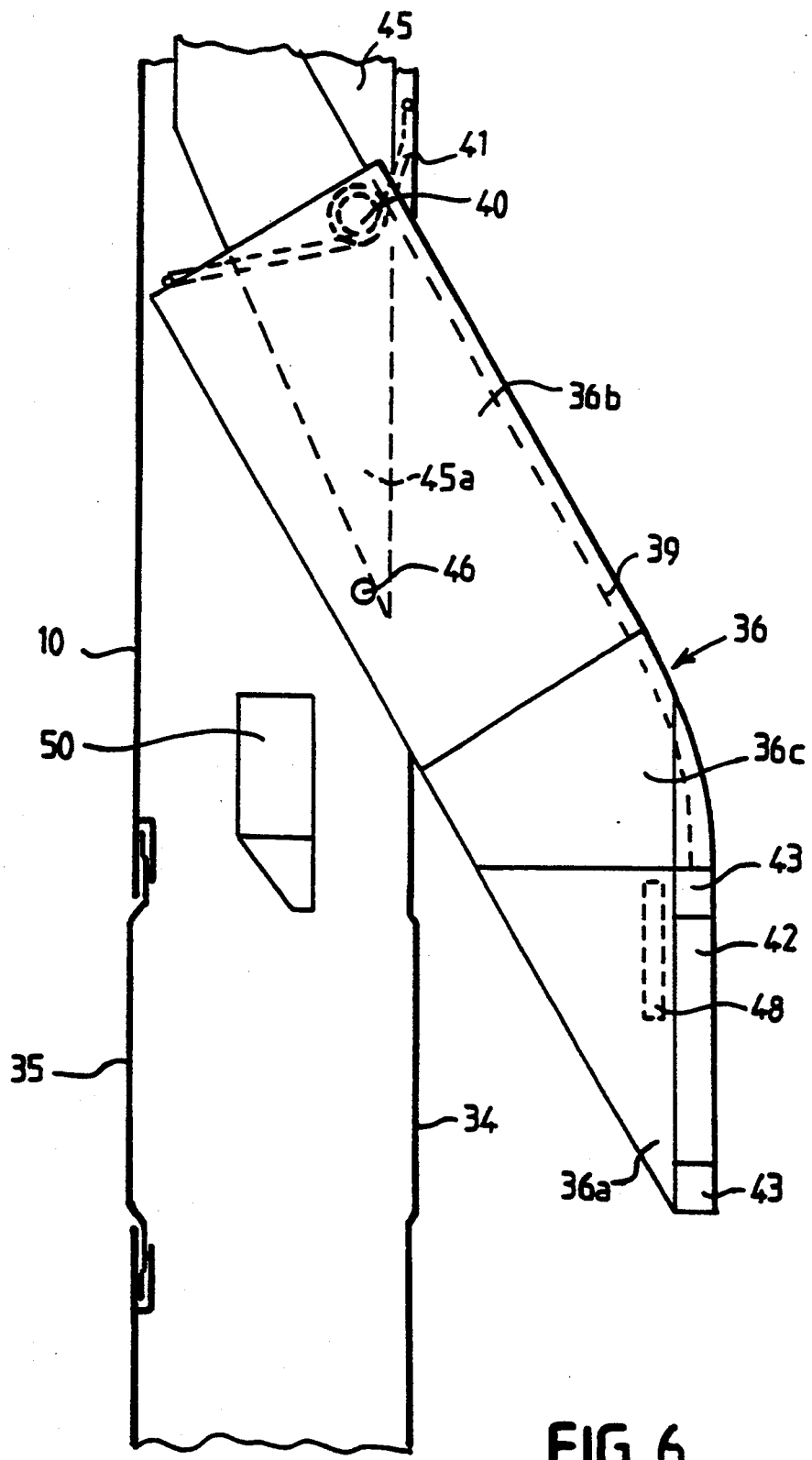
FIG. 6 is a larger scale view of the pivoting blade and of the sensor of the device shown in FIG. 5.

As can be seen in FIG. 6, the curved blade 36 is mounted so as to pivot on the casing of the mast 10 by means of an articulation pin 40 of transverse direction in the horizontal position when the mast 10 is in service in the upper internals of the reactor.

The curved blade 36 may be placed in the extracted position as shown in FIG. 6, by pivoting outwardly and passing through the longitudinal slot of the casing of the mast 10.

A spring 41, one end of which is fixed to the casing of the mast 10, comes to bear on the curved blade 36, so as to hold it in the extracted position shown in FIG. 6.

The curved blade 36 comprises an outer end 36a on which there is rotatably mounted the sensor 42 of the checking device, by means of aligned bearings 43 fixed to the end part.

The flexible sleeve 39 is connected at one of its ends to the sensor 42 and at its other end to the tube 38; a rotation means, above the upper level of the pool, ensures rotational driving of the tube 38 and of the flexible sleeve 39.

The outer end part 36a of the curved blade 36 is connected to the body 36b of the curved blade to which the articulation pin 40 is fixed by means of a fitting component 36c, so that, in the extracted position of the curved blade 36, shown in FIG. 6, the axes of the sensor 42, which is preferably cylindrical and of the bearings 43 are vertical.

The fitting component 36c is of a shape and size such that the vertical axis of rotation of the sensor 42 is at a distance from the axis of the mast 10 allowing introduction of the sensor, in one of the openings or one of the guide bores described above with relation to FIGS. 3 and 4.

The curved blade 36 may be used successively to position the sensor in the openings or bores situated at greater or lesser distances from the axis of the guide tube, by changing the fitting component 36c.

The to produce the body 36b of the curved blade may also have the shape of a deformable parallelogram, making it possible to hold the sensor, at the end of the part 36a of the curved blade 36, parallel to the axis of the mast 10 regardless of the distance of the sensor from this axis.

Such an embodiment will be described below with reference to FIGS. 7, 7A and 7B.

It is therefore possible to check each of the guide elements of a guide tube successively.

A control component 45 the end 45a of which is wedge-shaped makes it possible to adjust the position of the curved blade 36 which comprises a peg 46 projecting from one of its faces and constituting a stop intended to come into contact with the inclined edge of the wedge 45a.

By displacement of the control component 45 in the axial direction, it is possible to adjust the extraction position of the curved blade 36, which is returned into the maximum extraction position by the spring 41.

The sensor 42 may be rotationally driven by means of the tubular sleeve 39 which is capable of transmitting rotation while undergoing bending, in particular along the edge of the curved blade 36.

A lateral bearing spring 48 is fixed to the outer end part 36a on one of the faces of the curved blade 36.

The spring 48 makes it possible to ensure the lateral bearing of the curved blade on the reference surface of the guide elements.

The sensor 42 may be in the form of a capacitance sensor, an eddy current sensor, an optical or ultrasound sensor or even a laser radar.

The flexible tubular sleeve 39 transmitting the rotation to the sensor 42 may consist of a Rilsan tube inside which the power cables of the sensor 42 and the cables for gathering information coming from the sensor pass.

There will now be described, with reference to the drawings, a checking operation for a guide element of a guide tube using the device according to the invention.

The device is equipped with a curved blade 36 making it possible, by extraction of the curved blade controlled by the spring 41 and the component 45, to place the sensor 42 in a position such that its axis is perfectly aligned with the vertical axis of a guide element of the guide tube.

The mast 10 is lowered inside the pool with the curved blade in the retracted position and held in this position by the control component 45 so that its lower part engages in the central free space of a guide tube.

The mast 10 is lowered inside the guide tube down to a level such that the outer lower part 36a of the curved blade is slightly above a guide element, such as an opening in a guide plate or a bore in a sheath, which it is desired to check.

The curved blade is then placed in the extraction position by lifting up the control component 45 and fixing this component in a predetermined position corresponding to the desired extraction position of the curved blade.

The mast is then lowered so that the sensor 42 penetrates inside the guide element.

The sensor 42 is set in rotation by means of the flexible sleeve 39, so that the measurements carried out by the sensor and transmitted by means of the conductors passing inside the sleeve 39 are representative of the shape of the guide element over its entire circumference.

The measurements are recorded and used above the level of the pool, so that it is possible to determine whether or not the checked part of the guide element is satisfactory.

A television camera 50 enables a visual check to be made on the positioning of the curved blade 36 relative to the guide elements.

Figure 7:
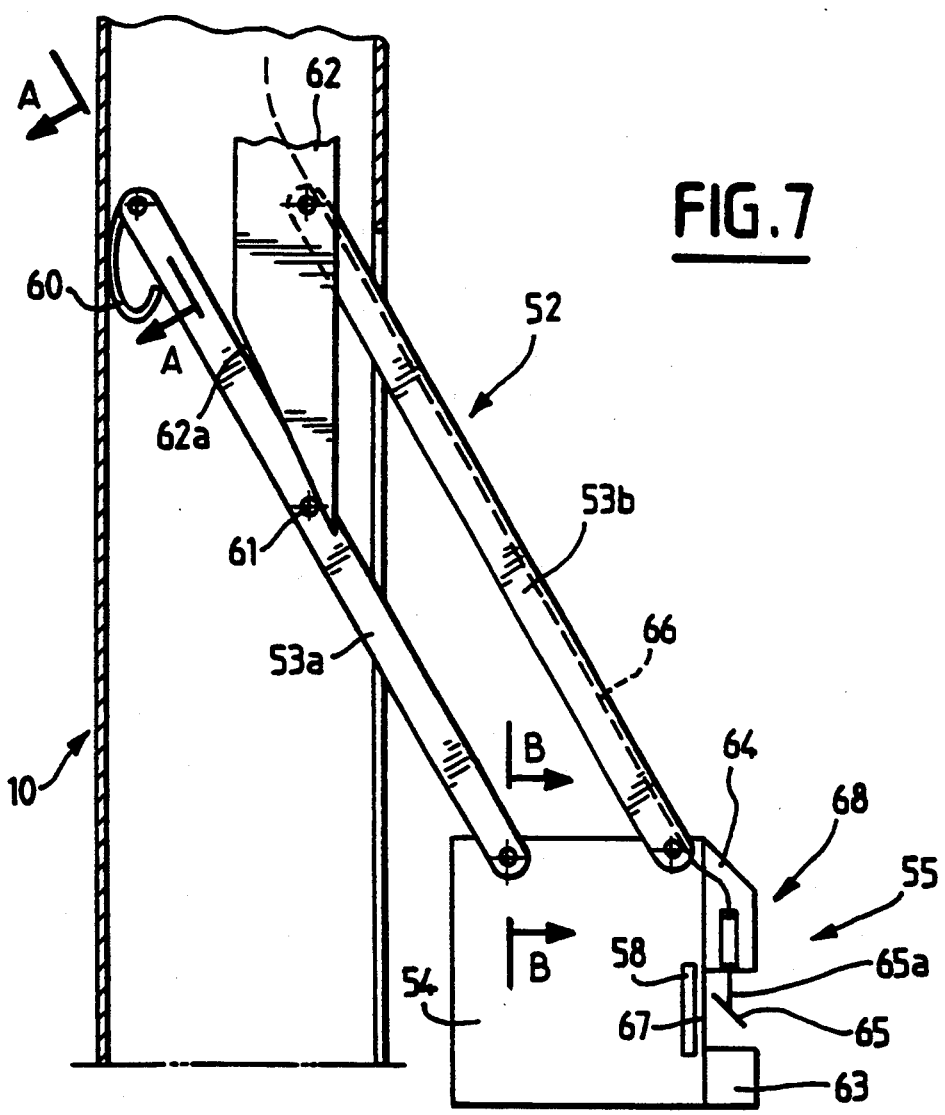
FIG. 7 is an elevation and partial sectional view of the pivoting blade of a checking device according to the invention and according to a second embodiment.
Figure 7A:
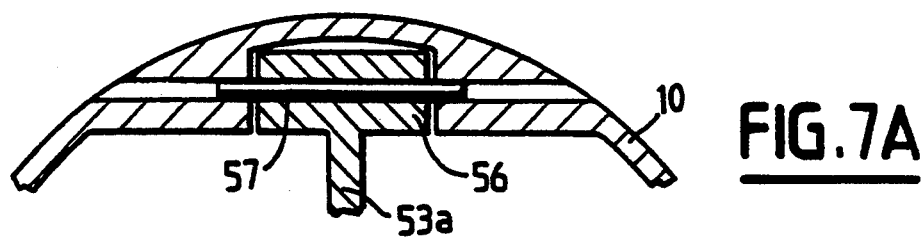
FIG. 7A is a sectional view along A—A of FIG. 7.
Figure 7B:
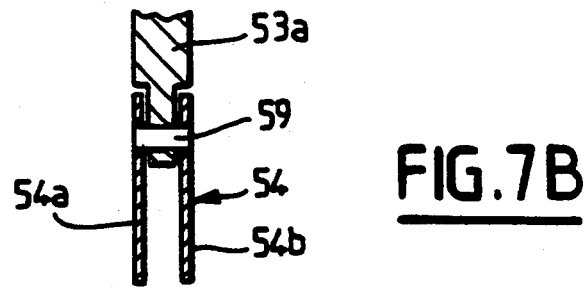
FIG. 7B is a sectional view along B—B of FIG. 7.

FIGS. 7, 7A and 7B show a curved blade produced in the form of a deformable parallelogram making it possible to hold the sensor constantly parallel to the axis of the mast 10.

The element 52 in FIG. 7, and which is equivalent to the curved blade 36 of the device of FIGS. 5 and 6, mainly comprises two parallel arms 53a and 53b and a measurement cell 54 carrying the measurement sensor 55.

The arms 53a and 53b are articulated at one of their ends to the mast 10 in the vicinity of its lower part, at two points situated in a plane of straight section of the mast 10 and at their other ends to the body of the measurement cell 54 which constitutes the outer part of the curved blade. The arms 53a and 53b are mounted on the mast 10 in the region of a longitudinal slot of sufficient width to allow the passage of the element 52 whose arms 53a and 53b and whose measurement cell 54 have a flat shape, as can be seen in FIGS. 7A and 7B.

As shown in 7A, the blade-shaped arm 53a comprises, at one of its ends, a flared part 56 engaging in a cutout machined in a part of increased thickness of the wall of the mast 10. The flared part 56 and the part of increased thickness of the mast are pierced with openings which are placed in the axial extension of one another when the flared part 56 of the arm is engaged in the mounting position in the cutout. An articulation pin 57 engaged in the aligned openings makes it possible to connect the arm 53a to the mast 10 in an articulated manner. The arm 53b is articulated in an identical manner to the mast 10, by means of one of its ends.

As shown in FIG. 7B, the end of the arm 53a opposite its end connected to the mast 10 is articulated to the body of the measurement cell 54 consisting of two parallel plane plates 54a and 54b fixed to one another with a certain spacing.

The end of the arm 53a is introduced between the plates 54a and 54b and connected to the cell 54 by an articulation pin 59.

The cell 54 carries a lateral bearing spring 58. The arm 53a is returned outwardly by a curved spring 60 which ensures, by means of the cell 54 and of the second arm 53b the return of the assembly 52 to the extracted position.

The arm 53a carries a stop 61 intended to come into contact with the inclined edge 62a of a control component 62 mounted so as to move in the axial direction of the mast 10.

By displacement of the control component in the axial direction, it is possible to adjust the extraction position of the curved blade which is returned into the maximum extraction position by the spring 60.

The sensor 55 consists of a laser diode 63 fixed to an edge of the cell 54 facing a support 64 constituting a bearing for the pin 65a of a rotating mirror 65. A flexible coupling 66 arranged along the length of the arm 53b is connected at one of its ends to the pin 65a of the mirror 65. The second end of the flexible coupling is connected to a means for rotationally driving the flexible coupling about its axis. It is thus possible to rotate the mirror 65 which is inclined so as to be oriented either towards a reference surface 67 of the cell 54 (as in the case in FIG. 7), or towards the outside of the cell 54.

When the sensor 55 is introduced into a guide element such as an opening in a guide plate or the bore in a guide sheath, the laser beam emitted by the diode 63 is reflected by the rotating mirror 65, which makes it possible to scan the inner surface of the guide element. The beam reflected by the guide element is recovered and processed so that distance measurements are obtained according to the laser radar method. The shape and the dimensions of the guide elements are therefore checked in a very precise manner. Recalibration of the laser radar maybe performed periodically by reflecting the beam off the surface 67 of the measurement cell.

After part of the guide element has been checked, the mast 10 may be displaced in translation and rotation about its axis, so as to introduce the sensor into a second guide element, for example in a second opening of a guide plate 35.

The curved blade may also be placed in a second extraction position allowing it to be positioned inside a guide element situated at a different distance from the axis of the guide tube.

For example, the openings 18 and 19 in the guide plates and the bores 28 and 29 in the sheaths 30 may be checked successively.

It is also possible, in the case of the continuous guide elements, to displace the mast and the curved blade in the axial direction of the guide tube so as to check the continuous guide element along its entire length.

The device according to the invention makes it possible to position the sensor very precisely so as to ensure its introduction into a predetermined guide element and to obtain extremely precise wear measurements.

The checking device, by virtue of the presence of the sensor-carrying curved blade, makes it possible to check all the guide elements of a guide tube successively, so that it is not necessary to have complex checking means available reproducing the geometry of the guide elements.

The positioning of the sensor is extremely precise, due to the interaction of the bearing elements of the curved blade and of the reference surfaces of the guide elements.

The pivoting blade or curved blade may be mounted in a manner different from that which has been described and may be actuated so as to be displaced in the extraction direction or in the retraction direction by means other than a spring and a wedge-shaped control element.

Rotation of at least part of the sensor so as to produce the scanning may be provided by a means other than a flexible transmission element controlled from the upper end of the mast. The sensor could be set in rotation by a motor or a reduction motor powered with electric current by means of a cable passing inside the casing of the mast.

The curved blade may comprise any fitting device allowing the sensor to be placed in position for checking any guide element of a guide tube.

Finally, the device according to the invention may be used for checking guide elements of any guide tube of the upper internals of a pressurized water nuclear reactor.

It is claimed:

1. Device for checking guide elements of a guide tube for upper internals of a pressurized water nuclear reactor, arranged underwater in a pool, said guide elements comprising, inside guide tubes having a vertical axis, guide openings passing through horizontal guide plates and bores of tubular sheaths having a vertical axis, opening laterally into a free space in a central part of said guide tube, said device comprising:

(a) a mast extending in a vertical direction in a service position of said mast in a pool of said reactor;

(b) means for centering said mast in said free space of said guide tube at its lower part;

(c) a flat blade-shaped element mounted for pivoting movement about at lest one horizontal pin on the lower part of said mast, between a retracted position and at least one extracted service position, in which an outer end of said blade-shaped element projects laterally relative to said mast;

(d) a sensor for insertion in said guide openings comprising at least one element mounted for rotation about a pin, at an outer end of said blade-shaped element so that the rotation pin of the rotary element of said sensor is vertical in said service position of said blade-shaped element;

(e) remote control means for displacing, by pivoting, said blade-shaped element; and (f) a rotation means and a sleeve having a first end connected to said sensor and a second end connected to the rotation means and cables passing through said sleeve for rotating and powering said sensor and for gathering measurement signals emitted by said sensor.

2. Device according to claim 1, wherein said blade-shaped element (52) comprises a measurement cell (54) to which said sensor (55) is fixed and two parallel arms (53a, 53b) each having one end articulated to said mast (10) and another end articulated to a measurement cell (54), so as to form an articulated parallelogram.

3. Device according to claim 1, wherein said outer end (36a) of said blade-shaped element (36) is fixed to a part (36b) of said blade-shaped element (36) which is mounted for pivoting on said mast (10), by means of a fitting component (36c) making it possible to adjust the position of said sensor (42) corresponding to said extracted service position of said blade-shaped element (36).

4. Device according to any one of claims 1 to 3, wherein said means for rotating said rotary element (65) of said sensor (42, 55) consist of a flexible element (39, 66) extending longitudinally along said mast (10), connected to said rotary element (65) of said sensor (42, 55) at one of its ends and comprising a second end at an upper part of said mast (10) via which rotation is transmitted to said flexible element (39, 66) and, via said flexible element, to said sensor (42, 55).

5. Device according to claim 4, wherein said flexible element is a tube made of flexible material.

6. Device according to any one of claims 1 to 3, wherein said means for pivotally displacing said blade-shaped element (36, 52) and for adjusting the extracted position of said blade-shaped element (36, 52) consist of a spring (41, 60) for returning said blade-shaped element (36, 52) into a totally extracted position and a control element (45, 62) moving axially along said mast (10) comprising a wedge-shaped end part (45a, 62a) interacting with a stop (46, 61) securely fastened to said blade-shaped element (36, 52).

7. Device according to any one of claims 1 to 3, comprising a bearing spring (48, 58) fixed to one face of said outer part (36a, 54) of said blade-shaped element (36,52).

8. Device according to any one of claims 1 to 3, wherein said means for centering said mast (10) in said free space (17, 27) of said guide tube (6) consist of a stop (34) projecting outwardly on said outer surface of said mast and of a spring (35) fixed to said outer surface of said mast (10) so as to project radially and to be positioned opposite said stop (34) relative to said axis of said mast.

9. Device according to any one of claims 1 to 3, wherein said sensor (42) is selected from the group consisting of a capacitance sensor, eddy current sensor, ultrasound sensor, and laser radar.

10. Device according to claim 9, wherein said sensor (55) is of the laser radar type and comprises a diode (63) and a rotating mirror (65) mounted on a measurement cell (54) forming said outer end part of said blade-shaped element (52).

11. Device according to claim 10, wherein said measurement cell (54) comprises a reference surface (67) so as to provide calibration of measurements carried out by said laser radar.

* * * * *